US008289685B2

(12) United States Patent
Li et al.

(10) Patent No.: US 8,289,685 B2
(45) Date of Patent: Oct. 16, 2012

(54) PORTABLE ELECTRONIC DEVICE

(75) Inventors: Jian Li, Shenzhen (CN); Han-Zheng Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 99 days.

(21) Appl. No.: 12/981,534

(22) Filed: Dec. 30, 2010

(65) Prior Publication Data

US 2011/0261515 A1  Oct. 27, 2011

(30) Foreign Application Priority Data

Apr. 23, 2010  (CN) .......................... 2010 1 0153691

(51) Int. Cl.
*G06F 1/16* (2006.01)
*H05K 5/00* (2006.01)
*H05K 7/00* (2006.01)
(52) U.S. Cl. .................. 361/679.26; 361/679.55
(58) Field of Classification Search ............ 361/679.21, 361/679.26–679.3, 679.55; 16/308
See application file for complete search history.

(56) References Cited

U.S. PATENT DOCUMENTS

| | | | | |
|---|---|---|---|---|
| 5,107,402 A * | 4/1992 | Malgouires | ............ | 361/679.17 |
| 5,251,102 A * | 10/1993 | Kimble | .................... | 361/679.09 |
| 5,255,214 A * | 10/1993 | Ma | ........................... | 361/679.06 |
| 5,268,817 A * | 12/1993 | Miyagawa et al. | ...... | 361/679.07 |
| D349,489 S * | 8/1994 | Wang | ........................... | D14/375 |
| 5,337,212 A * | 8/1994 | Bartlett et al. | ........... | 361/679.27 |
| 5,347,630 A * | 9/1994 | Ishizawa et al. | ............. | 345/538 |
| 5,383,138 A * | 1/1995 | Motoyama et al. | ...... | 361/679.27 |
| 5,494,447 A * | 2/1996 | Zaidan | .......................... | 439/31 |
| 5,559,670 A * | 9/1996 | Flint et al. | ................ | 361/679.06 |
| 5,682,645 A * | 11/1997 | Watabe et al. | .................. | 16/338 |
| 5,729,429 A * | 3/1998 | Margaritis et al. | ....... | 361/679.28 |
| 5,900,848 A * | 5/1999 | Haneda et al. | ................ | 345/1.1 |
| 6,005,767 A * | 12/1999 | Ku et al. | .................. | 361/679.27 |
| 6,006,243 A * | 12/1999 | Karidis | ..................... | 708/100 |
| 6,134,103 A * | 10/2000 | Ghanma | .................. | 361/679.05 |
| 6,198,624 B1 * | 3/2001 | Margaritis | .............. | 361/679.05 |
| 6,229,693 B1 * | 5/2001 | Karidis et al. | .......... | 361/679.05 |
| 6,233,138 B1 * | 5/2001 | Osgood | .................... | 361/679.05 |
| 6,262,885 B1 * | 7/2001 | Emma et al. | ............. | 361/679.05 |
| 6,266,236 B1 * | 7/2001 | Ku et al. | ................. | 361/679.27 |
| 6,317,927 B1 * | 11/2001 | Lai et al. | ........................ | 16/342 |
| 6,381,128 B1 * | 4/2002 | Kramer | .................... | 361/679.55 |
| 6,384,811 B1 * | 5/2002 | Kung et al. | ................... | 345/168 |
| 6,430,038 B1 * | 8/2002 | Helot et al. | .............. | 361/679.05 |
| 6,464,195 B1 * | 10/2002 | Hildebrandt | ................. | 248/460 |
| 6,507,977 B2 * | 1/2003 | Lu | .................................... | 16/342 |
| 6,510,588 B2 * | 1/2003 | Eromaki | ....................... | 16/308 |
| 6,532,147 B1 * | 3/2003 | Christ, Jr. | ................ | 361/679.27 |

(Continued)

FOREIGN PATENT DOCUMENTS

CN  1506790 A  6/2004

*Primary Examiner* — Adrian S Wilson
(74) *Attorney, Agent, or Firm* — Altis Law Group, Inc.

(57) ABSTRACT

An electronic device includes a main body, a fixing member rotatably mounted on the main body, and a liquid crystal display rotatably mounted on the fixing member. The liquid crystal display can rotate from a first position facing the main body to a second position facing away from the main body.

8 Claims, 5 Drawing Sheets

U.S. PATENT DOCUMENTS

| | | | |
|---|---|---|---|
| 6,639,788 B1 * | 10/2003 | Liao et al. | 361/679.22 |
| 6,665,175 B1 * | 12/2003 | deBoer et al. | 361/679.06 |
| 6,711,782 B1 * | 3/2004 | Su | 16/342 |
| 6,826,043 B2 * | 11/2004 | Chang | 361/679.27 |
| 6,829,140 B2 * | 12/2004 | Shimano et al. | 361/679.09 |
| 6,963,485 B2 * | 11/2005 | Hong | 361/679.55 |
| 6,972,947 B2 * | 12/2005 | Duncan | 361/679.55 |
| 6,985,356 B2 * | 1/2006 | Wang | 361/679.06 |
| 7,091,961 B2 * | 8/2006 | Ditzik | 345/173 |
| 7,215,538 B1 * | 5/2007 | Chen et al. | 361/679.06 |
| 7,251,129 B2 * | 7/2007 | Lee et al. | 361/679.55 |
| 7,333,323 B1 * | 2/2008 | Dawson et al. | 361/679.27 |
| 7,549,193 B2 * | 6/2009 | Lee et al. | 16/342 |
| 7,690,081 B2 * | 4/2010 | Chern | 16/342 |
| 7,903,400 B1 * | 3/2011 | Chen et al. | 361/679.27 |
| 2002/0186530 A1 * | 12/2002 | Nakajima et al. | 361/683 |
| 2004/0066614 A1 * | 4/2004 | Hong | 361/683 |
| 2004/0165342 A1 * | 8/2004 | Chang | 361/681 |
| 2005/0063145 A1 * | 3/2005 | Homer et al. | 361/683 |
| 2005/0128695 A1 * | 6/2005 | Han | 361/683 |
| 2006/0279920 A1 * | 12/2006 | Lee et al. | 361/683 |
| 2008/0062624 A1 * | 3/2008 | Regen et al. | 361/680 |
| 2009/0147458 A1 * | 6/2009 | Wang et al. | 361/679.27 |

* cited by examiner

PORTABLE ELECTRONIC DEVICE

BACKGROUND

1. Technical Field

The present disclosure relates generally to portable electronic devices, and especially to a portable electronic device having a liquid crystal display.

2. Description of Related Art

A commonly used portable electronic device includes a main body and a liquid crystal display hinged on the main body, whereby an opening angle between the liquid crystal display and the main body and a corresponding viewing angle can be adjusted. However, the entire portable electronic device must be rotated to allow an opposite view of the display, an inconvenient requirement, especially when the portable device is on a narrow support.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
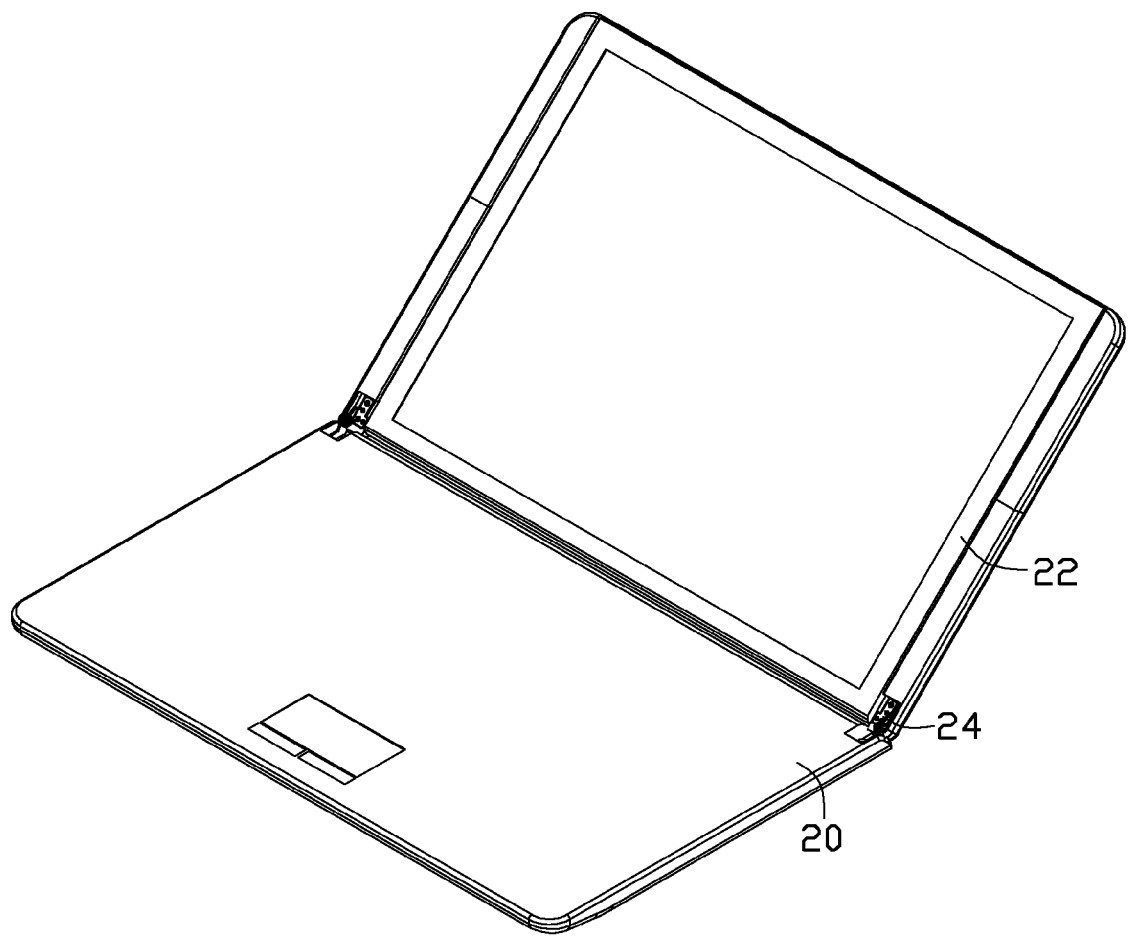
FIG. 1 is an isometric view of a first embodiment of a portable electronic device, with the liquid crystal display in a first position.
Figure 2:
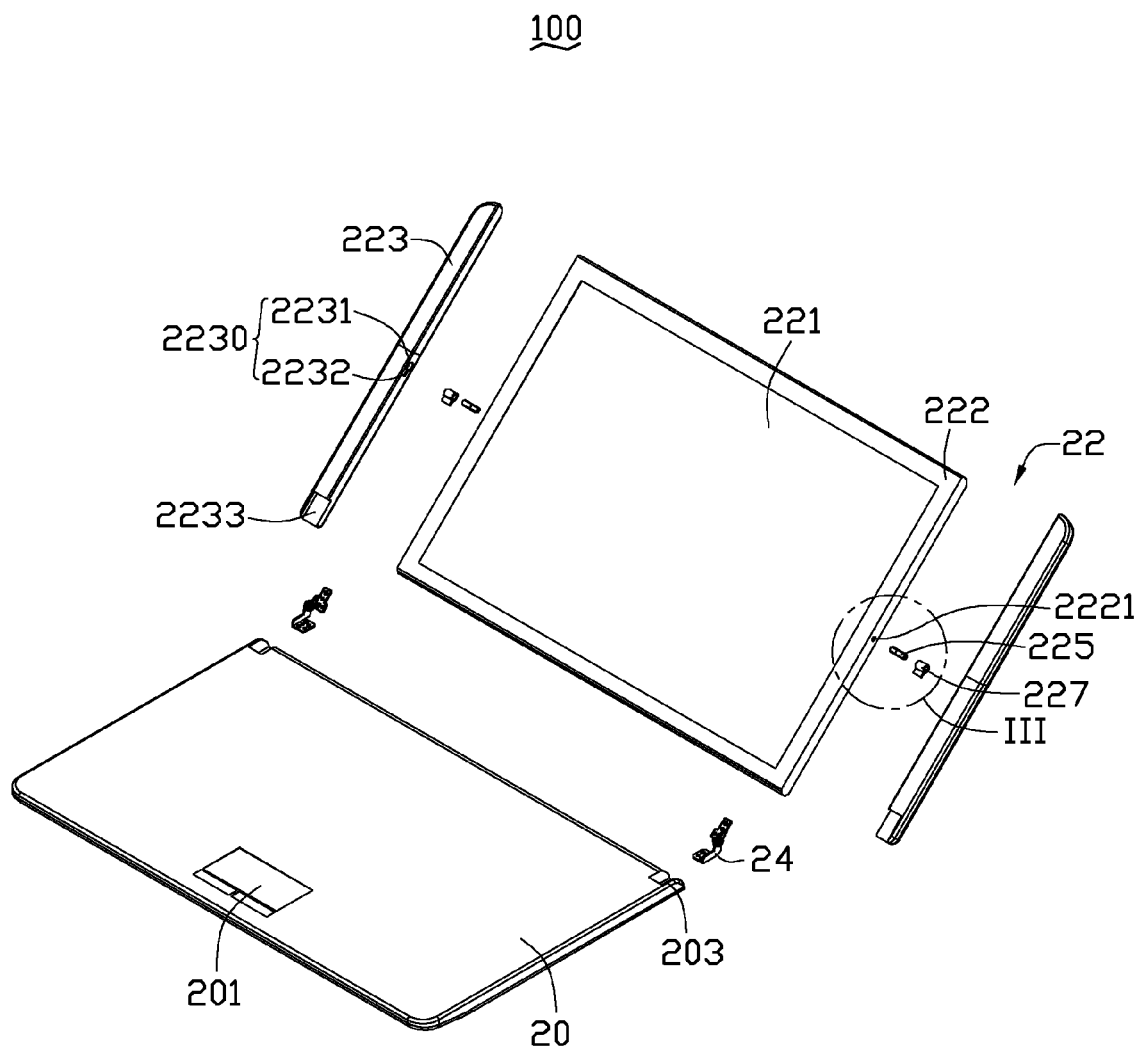
FIG. 2 is an exploded, isometric view of the portable electronic device of FIG. 1.

Referring to FIGS. 1 and 2, an embodiment of an electronic device 100 includes a rectangular main body 20, a liquid crystal display (LCD) 22, and a hinge 24 hinging the display 22 to the main body 20. The main body 20 has a touchpad 201 and a keyboard (not shown). The main body 20 defines a slot 203 at each bottom corner thereof for mounting the hinge 24. In the illustrated embodiment, the portable electronic device 100 is a notebook. Alternatively, the electronic device 100 may be a cell phone, personal digital assistant (PDA), or other device.

The LCD 22 includes a panel 221, a rectangular frame 222 mounted on the panel 221, two longitudinal fixing members 223, two shafts 225, and two sleeves 227.

Figure 3:
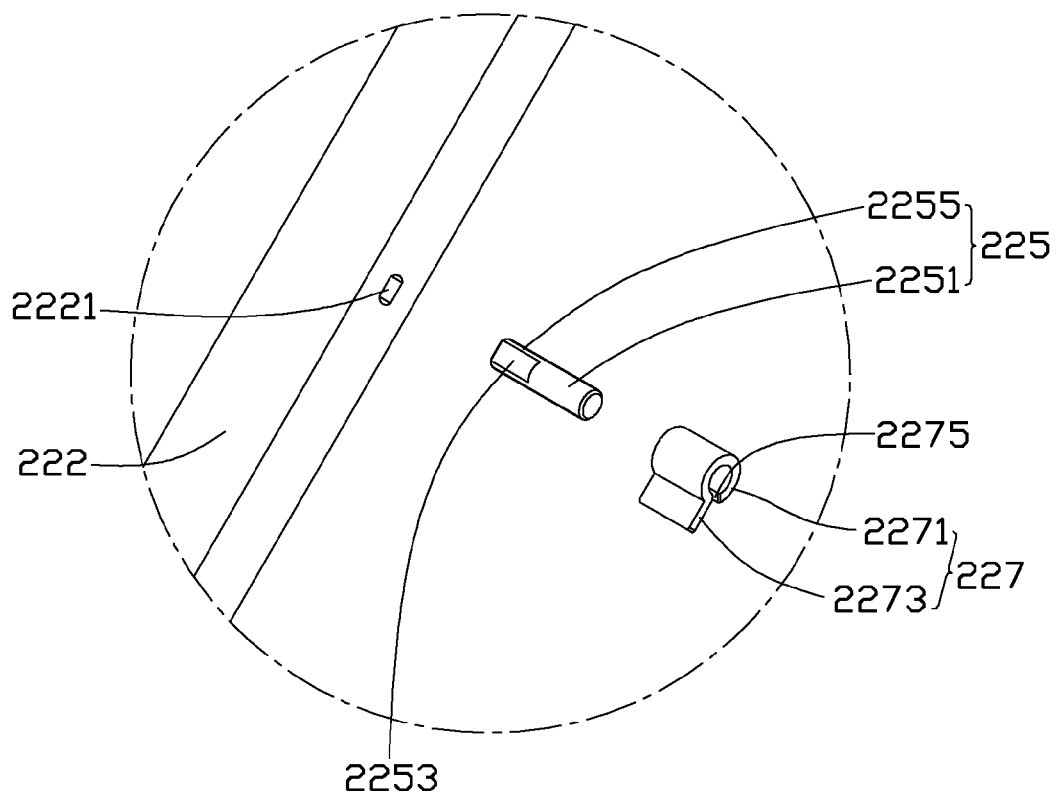
FIG. 3 is an enlarged view of a circled portion III of FIG. 2 shown in FIG. 2.

Also referring to FIG. 3, the frame 222 defines two non-circular stopping holes 2221 opposite to each other at an outer surface for mounting the shafts 225. Each fixing member 223 defines a receiving groove 2230 for receiving one of the sleeves 227. The receiving groove 2230 includes a substantially circular first receiving portion 2231 and a longitudinal second receiving portion 2232 communicating with the first receiving portion 2231. The fixing member 223 defines a mounting groove 2233 at an end for mounting the hinge 24. The shaft 225 includes a substantially cylindrical rotating portion 2251 at an end thereof, and the shaft 225 forms a fixing portion 2255 at the other end opposite to the rotating portion 2251 corresponding to the stopping groove 2221. The fixing portion 2255 defines two cutting surfaces 2253 opposite to each other.

The sleeve 227 includes a substantially circular elastic clamping portion 2271 and a latching portion 2273 formed on the clamping portion 2271. An inner diameter of the elastic clamping portion 2271 is less than an outer diameter of the rotating portion 2251 of the shaft 225. The clamping portion 2271 defines a slit 2275 at a side wall thereof along the axial direction, thus the clamping portion 2271 can be open for receiving and holding the shaft 225. The latching portion 2273 is formed on an outer surface adjacent to the slit 2275.

In assembly, the fixing portion 2255 of the shaft 225 is inserted in the stopping groove 2221 of the frame 222, and the cutting surface 2253 of the fixing portion 2255 contacts a side surface of the stopping groove 2221, thereby non-rotatably mounting the shaft 225 in the stopping groove 2221. The rotating portion 2251 protrudes out of the frame 222. The sleeve 227 is opened, allowing the rotating portion 2251 to pass therethrough. The sleeve 227 holds the rotating portion 2251 elastically. The sleeve 227 and the rotating portion 2251 are received in the receiving groove 2230 of the fixing member 223. The clamping portion 2271 of the sleeve 227 is received in the first receiving portion 2231, and the latching portion 2273 is received in the second receiving portion 2232, thus rotatably mounting the two fixing members 223 on both sides of the frame 222 respectively. An end of each hinge 24 is fixed in the mounting groove 2233 of the fixing member 223, and the other end of the hinge 24 is mounted in the slot 203 of the main body 20, thus the two fixing members 223 are rotatably mounted on the main body 20, and the LCD 22 is rotatably positioned between the two fixing members 223. A viewing angle and an opening angle between the LCD 22 and the main body 20 can be adjusted by rotating the fixing member 223.

Figure 4:
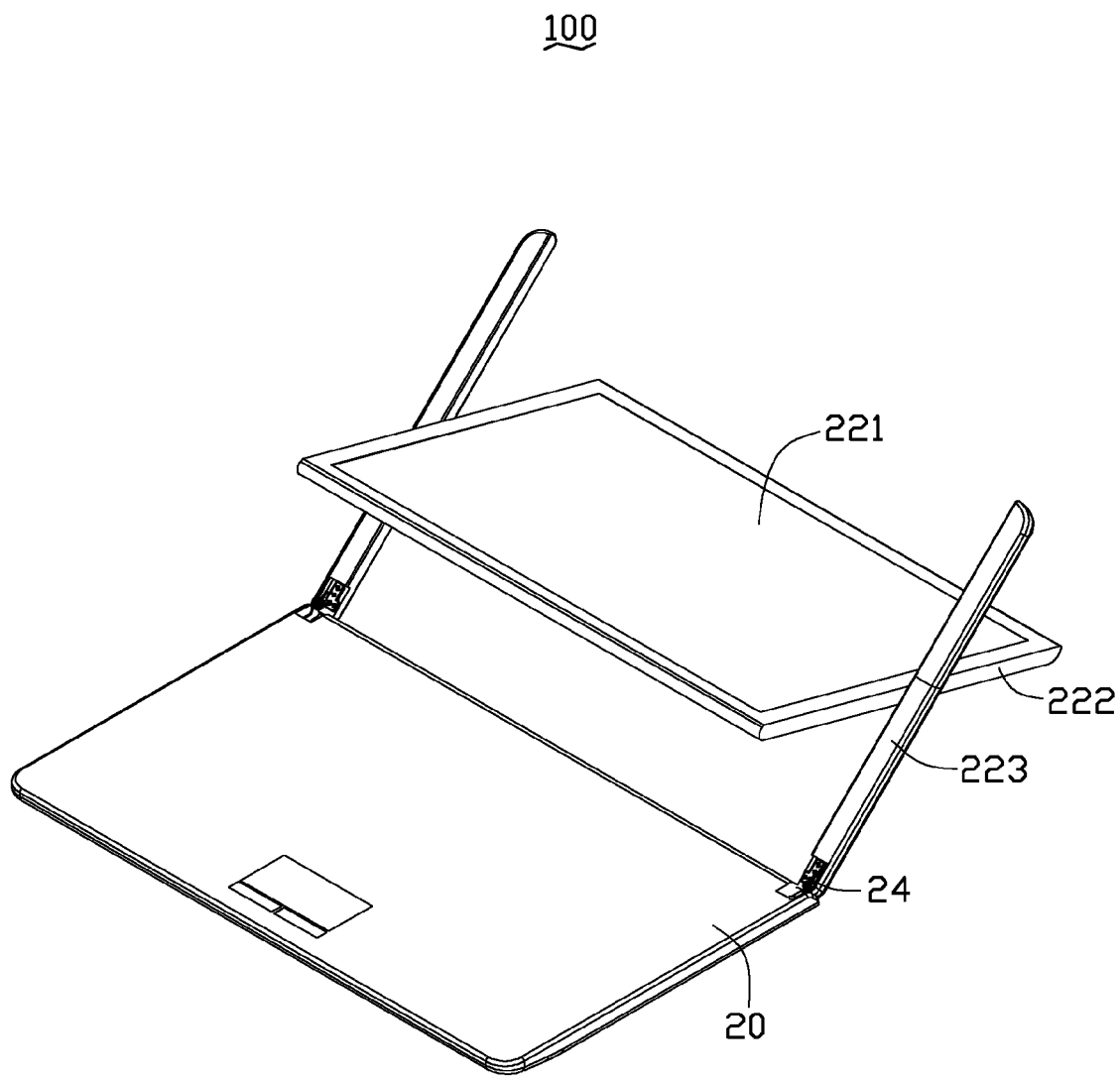
FIG. 4 is an isometric view of the portable electronic device of FIG. 1, with the liquid crystal display in a second position.

Also referring the FIG. 4, the LCD 22 alone can be rotated relative to the fixing member 223 to a predetermined position. The LCD 22 retains the predetermined position by friction between the fixing member 223 and LCD 22.

It should be noted that the portable electronic device may include only one fixing member 223 mounted at a middle portion on the LCD 22, and the LCD 22 may also be opened and closed.

Figure 5:
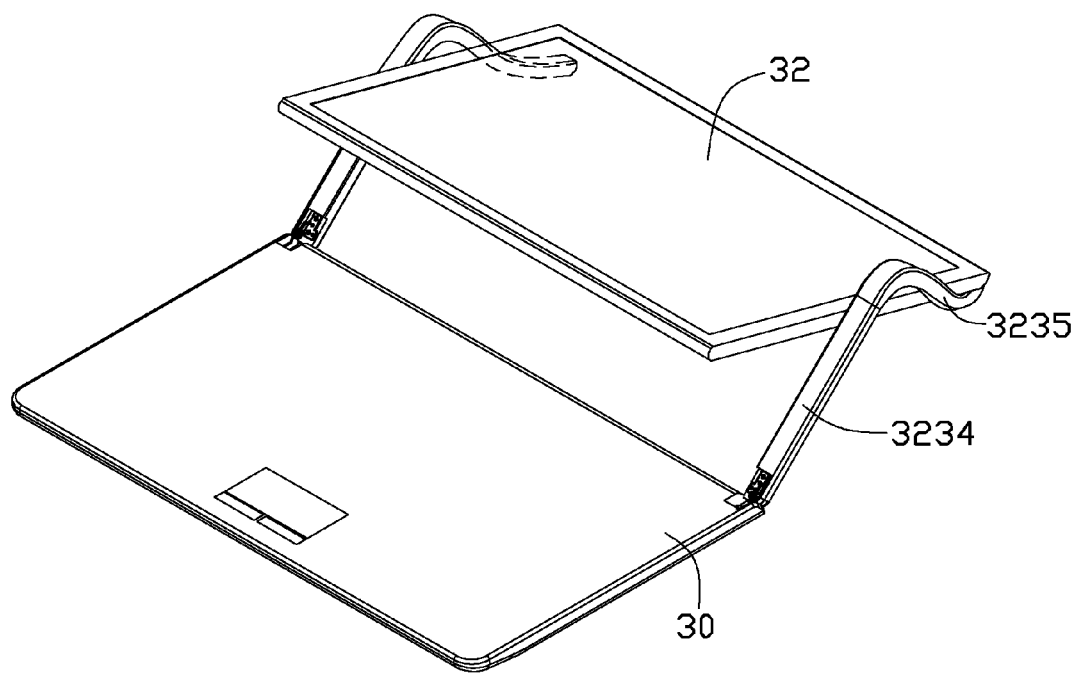
FIG. 5 is an isometric view of a second embodiment of the portable electronic device.

FIG. 5 shows a second embodiment of an electronic device 300, differing from the first embodiment of the electronic device 100 only in that the fixing member 323 includes a supporting portion 3234 adjacent to the main body 30 and an angling portion 3235 formed on the supporting portion 3234. When the LCD 32 is rotated to the predetermined position, the angling portion 3235 may angle to the back of the LCD 32 for supporting the LCD 32 and retaining the predetermined position.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A portable electronic device comprising:
   a main body;
   a fixing member comprising a supporting portion rotatably mounted on the main body and an angling portion formed on the supporting portion; and
   a liquid crystal display rotatably mounted on the supporting portion of the fixing member, the liquid crystal display being rotatable from a first position facing the main body to a second position facing away from the main body, wherein the angling portion is bent to a predetermined degree during usage to support the liquid crystal display at a predetermined position.

2. The portable electronic device of claim 1, wherein the liquid crystal display further comprises a shaft and a sleeve sleeved on the shaft and a frame, the shaft comprising a fixing portion non-rotatably mounted on the frame.

3. The portable electronic device of claim 2, wherein the sleeve defines a slit thereon to form an elastic clamping portion for clamping the shaft.

4. The portable electronic device of claim 3, wherein the fixing portion is non-circular, and the frame defines a stopping groove for receiving the fixing portion.

5. The portable electronic device of claim 4, wherein the sleeve further comprises a latching portion formed on the elastic clamping portion, the at least one fixing member defines a receiving groove for receiving the sleeve, and the receiving groove comprises a first receiving portion for receiving the elastic clamping portion and a second receiving portion for receiving the latching portion.

6. The portable electronic device of claim 5 wherein a number of the at least one fixing member is two, and the liquid crystal display is positioned between the two fixing members.

7. The portable electronic device of claim 6, further comprising two hinges, each fixing member defines a mounting groove, the main body defines a slot corresponding to the mounting groove, an end of the hinge is mounted in the mounting groove, and another end of the hinge is mounted in the slot.

8. A portable electronic device comprising:
a main body;
at least one fixing member comprising a supporting portion rotatably mounted on the main body and an angling portion formed on the supporting portion; and
a liquid crystal display comprising a frame, a shaft, and a sleeve, the frame defining a stopping groove, the shaft comprising a non-circular fixing portion non-rotatably mounted in the stopping groove of the frame and a rotating portion connected to the fixing portion, the sleeve sleeved on the rotating portion of the shaft and received in the at least one fixing member, such that the liquid crystal display rotatably mounted on the supporting portion, wherein the liquid crystal display is rotatable from a first position facing the main body to a second position facing away from the main body, and the angling portion is bent to a predetermined degree during usage to support the liquid crystal display at a predetermined position.

* * * * *